United States Patent [19]

Kwon et al.

[11] Patent Number: 5,561,183

[45] Date of Patent: Oct. 1, 1996

[54] PREPARATION METHOD OF ANTIBACTERIAL AND DEODORANT POLYESTER FOR FIBER

[75] Inventors: Lee S. Kwon; In K. Choi, both of Jeollabuk-do, Rep. of Korea

[73] Assignee: Sam Yang Co., Ltd., Seoul, Rep. of Korea

[21] Appl. No.: 611,871

[22] Filed: Mar. 6, 1996

[30] Foreign Application Priority Data

Aug. 14, 1995 [KR] Rep. of Korea ............... 95-24957

[51] Int. Cl.$^6$ ............... C08K 3/10; C08G 63/00
[52] U.S. Cl. ............... 524/413; 528/176; 528/180; 528/185; 528/193; 528/281; 528/286; 528/288; 528/299; 528/308.3; 528/308.6; 525/437; 524/403; 524/414; 424/66; 424/67; 424/76.1; 424/76.8
[58] Field of Search ............... 528/281, 286, 528/288, 299, 308.3, 308.6, 176, 180, 185, 193; 525/437; 524/403, 413, 414; 424/66, 67, 76.1, 76.8

[56] References Cited

PUBLICATIONS

CA (124):88245.
CA (124):30538.
CA (123):10272.
CA (122):315435.

*Primary Examiner*—Samuel A. Acquah
*Attorney, Agent, or Firm*—Nikaido, Marmelstein, Murray & Oram LLP

[57] ABSTRACT

Antibacterial and deodorant polyester for fiber which is much improved in melt viscosity, is prepared by adding the melt viscosity enhancers represented by the following general formulas I to IV and compounding with zirconium phosphate:

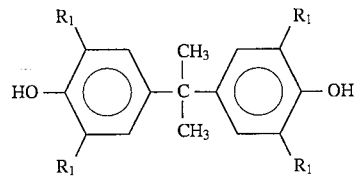

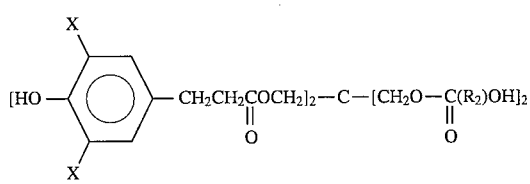

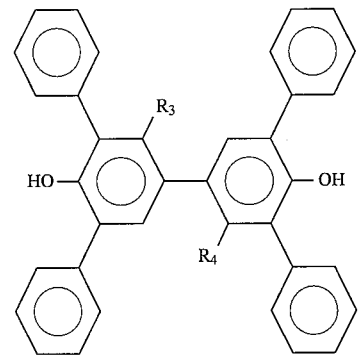

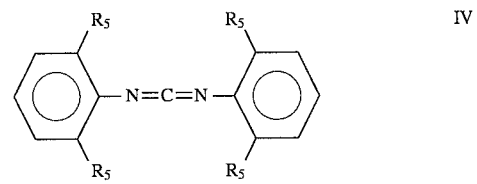

3 Claims, No Drawings

PREPARATION METHOD OF ANTIBACTERIAL AND DEODORANT POLYESTER FOR FIBER

BACKGROUND OF THE INVENTION

1. Field of the Invention

The present invention relates, in general, to a method for preparing antibacterial and deodorant polyester useful for fiber and, more particularly, to an improvement in melt viscosity, along with the method.

2. Description of the Prior Art

Various microorganisms, such as bacteria and fungi, exist in all of the human living environments. Human skin is very susceptible to the microorganisms due to sweat, a good proliferative medium. Clothes are also a good target for the microorganisms whether they absorb sweat or not. For example, the clothes which absorb sweat well provide the microorganisms with good habitants, leading the fibril of the clothes to brittleness and stinking. Clothes serve to carry the microorganisms to human skin even though they are little absorbent of sweat. The microorganisms easily adhere to clothes or skin through vehicles and proliferate, causing diseases including skin troubles.

Accordingly, much research and study has been directed to the development of polymers for fiber which are neater, more pleasant and more sanitary. As a result, many functional fibers have been developed. Among them are deodorant fibers with antibacterial activity. These fibers are useful for a plurality of purposes ranging from bedclothes, such as quilt, matrix and cushion, clothes, such as underwear, hosiery and sport wears, interior cloths, such as wallpaper, carpets and curtains, household appliances, such as towels and dish cloths, to industrial materials, such as filters.

It is well known that antibacterial agents are added upon synthesis or compounding, to give antibacterial and deodorant polymers for fiber which overcome the problems attributable to the microorganisms such as bacteria and fungi, to an extent. For example, Japanese Pat. Laid-Open Publication No. Heisei 1-42288 introduces the addition of a slurry of antibacterial and deodorizing agent in reaction monomer at polymerizing process. This is problematic in many respects. First, the agent aggregates or reacts with catalyst upon polymerizing reaction, lowering fiber-making property. In addition, while making fibers, there occurs a lot of cut yarn in the presence of the agent. Further, most of the agent is distributed at the center of the cross section of the fiber, so that it does not make a great contribution to antibacterial activity.

The antibacterial activity of fiber can be achieved by making ion-exchangeable polyester fibers and treating them with copper salt and silver salt in water, as disclosed in Japanese Pat. Laid-Open Publication No. Sho. 54-38951. While such fibers undergo after-process such as dyeing, the antibacterial activity is however reduced and the resulting articles feel rough.

When being measured under the condition of 100 Rad/Sec at 285° C., ordinary polyester chips show a melt viscosity ranging from about 2,800 to 3,000 poise. In contrast, the polyester chip comprising 3% by weight or more of antibacterial inorganic particles has a significant reduced melt viscosity, for example, 1,000 poise or less. Thus, such antibacterial polyester chips are of lower hardness than ordinary polyester chips and when they are fed into extruder processing part, the pressure of the pack is remarkably lowered to the extent that the fiber-making property is degraded. In addition, it is difficult to obtain fibers of uniform fitness by spinning such chips. In an extreme case, the chips comprising antibacterial agent lead to the generation of broken short fiber, leading pressure hunting, dropping and cut yarn, significantly decreasing work efficiency.

SUMMARY OF THE INVENTION

Therefore, it is an object of the present invention to overcome the above problems encountered in prior arts and to provide a method for preparing an antibacterial and deodorant polymer superior in melt viscosity.

Intensive researches repeated by the present inventors aiming to develop a method for preparing a polymer having such preferred properties have resulted in finding that a polyester fiber which is superior in work efficiency as well as antibacterial and deodorizing activity can be obtained by the addition of both the melt viscosity enhancers represented by the following general formula I:

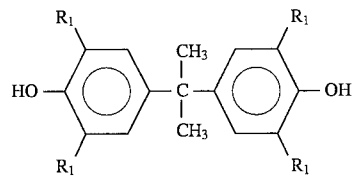

wherein $R_1$ is selected from the group consisting of $C_4H_9$, $C_6H_5$ and H, being the same and different from each other, or II:

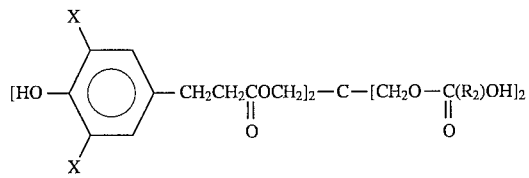

wherein $R_2$ is $C_nH_{2n}$ wherein n is an integer of 3 to 9, and by the following general formula III:

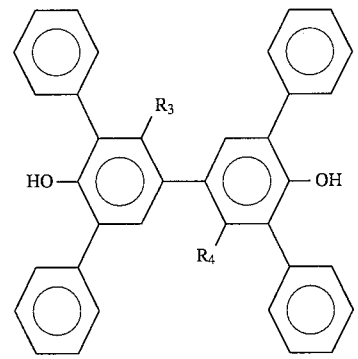

wherein $R_3$ is a hydrogen, a chlorine atom, a methyl group or a phenyl group; and $R_4$ is a hydrogen, a methyl group or a phenyl group, or IV:

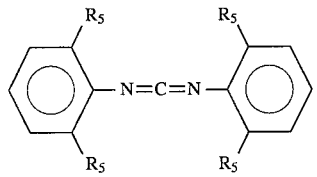

wherein $R_5$ is t-butyl, and zirconium phosphate, an antibacterial and deodorizing agent, in a polyester-preparing system.

DETAILED DESCRIPTION OF THE INVENTION

In preparing polyester fiber through the reaction of typical acidic components with diol components, an improvement is that, in the esterification, zinc acetate is dissolved in ethylene glycol to serve as a catalyst and a viscosity enhancer represented by the following general formula I:

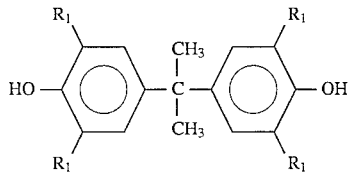

wherein $R_1$ is selected from the group consisting of $C_4H_9$, $C_6H_5$ and H, being the same and different from each other, or II:

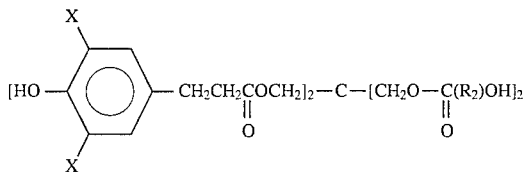

wherein $R_2$ is $C_nH_{2n}$ wherein n is an integer of 3 to 9, is added at an amount of 0.2 to 2.0% by mole relative to the resulting polyester and, in the polycondensing reaction, another viscosity enhancer represented by the following general formula III:

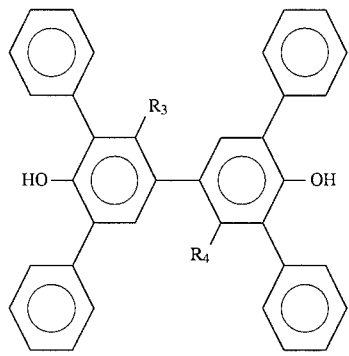

wherein $R_3$ is a hydrogen, a chloride atom, a methyl group or a phenyl group; and $R_4$ is a hydrogen, a methyl group or a phenyl group, or IV:

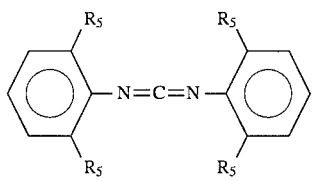

wherein $R_5$ is t-butyl, is added at an amount of 0.1 to 1.5% by mole relative to the resulting polyester, to give polymers which is then compounded with zirconium phosphate, an antibacterial and deodorizing agent, at any steps prior to the spinning process, in accordance with the present invention.

The antibacterial and deodorant zirconium phosphate is obtained by replacing an ion-exchangeable ion with an antibacterial and deodorant metal ion, in part or completely. Useful antibacterial and deodorant metal ion includes, for example, silver, copper, zinc insert is particularly preferred in consideration of antibacterial and deodorizing effect. The content of such antibacterial metal ions is on the order of about 0.1 to 17% based on the weight of zirconium phosphate. In the present invention, there is used an antibacterial and deodorant zirconium phosphate comprising about 0.01 to 10% of copper ion, about 0.05 to 10% of zinc ion and abut 0.01 to 6.5% of silver ion, which shows far superior antibacterial and deodorant activity ("%" as used herein means "weight %" based on the weight of zirconium phosphate dried at 120° C.).

It is effective for the antibacterial and deodorant activity and the physical properties of the master batch that the antibacterial and deodorant zirconium phosphate is used at an amount of about 0.05 to 10% by weight based on the weight of the resulting polyester, and preferably about 0.05 to 3% by weight.

It is also effective to use a small diameter of the zirconium as possible; however, a diameter of 0.01 to 5μ is preferred in consideration of economics.

As mentioned above, the compound of the general formula I or II is preferably added at an amount of 0.2 to 20% by mole while the amount of the compound of the general formula III or IV preferably falls into a range from 0.1 to 1.5% by mole. For example, if the compounds are used at an amount lower than the respective lower limits, the resulting polymer is little improved in melt viscosity. On the other hand, if the compounds of the general formulas I or II and III or IV are used at excess amounts, the melt viscosity is too increased to improve the spinning property and thus, the resulting fiber becomes poor in physical properties.

In accordance with the present invention, the polyester resin for antibacterial and deodorant polyester is prepared by using melt viscosity enhancers represented by the general formulas I to IV and feeding antibacterial and deodorant zirconium phosphate at any step prior to the spinning process.

The addition of the compounds represented by the general formulas I to IV may be done by any of well-known methods and it is preferred that they are added in a slurry state wherein zinc acetate is dissolved in ethylene glycol to serve as a catalyst for esterification, or along with a polycondensing catalyst upon polycondensation.

The antibacterial and deodorant polyester for fiber according to the present invention is prepared by a well-known method, for example, comprising the steps of esterification at a temperature of 240° to 250° C., addition of polycondensing catalyst, pre-drying at 110° C. and drying in vacuo at 130° C. for 5 hours.

After setting the temperatures of the extruder zone A part, B part, C part, gear pump and spin block into 250, 260, 270, 280 and 290, respectively, the spinning of the polyester is done at a speed of 1,370 m/min.

A better understanding of the present invention may be obtained in light of following examples which are set forth to illustrate, but are not to be construed to limit, the present invention.

EXAMPLE I 4,780 g of a polyethyleneterephthalate oligomer obtained by esterification of terephthalic acid with ethylene glycol (amount ratio 1:1.3), 88.7 g of the compound represented by the following structural formula:

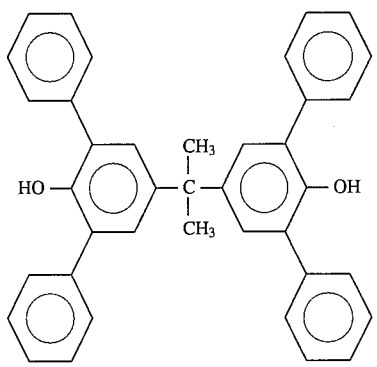

and 25.6 g of zinc acetate were dissolved in 3% ethylene glycol and esterified at a temperature of 245° C. for 75 min. Thereafter, 78.7 g of the compound represented by the following structural formula:

at was added and then, polycondensed at a temperature of 280° to 285° C. for 2 hours in the presence of 80.5 g of a mix catalyst of triethylphosphate, cobalt acetate, antimony trioxide and butylene malate. The polyester thus obtained was dried at 110° C. and then, 130° in vacuo for 5 hours. Under the condition of 285° C. and 100 rad/sec, it was tested for melt viscosity and intrinsic viscosity and the results are given as shown in Table 1 below. The prepared polyester chip was compounded with 38 g of copper-zinc-silver zirconium phosphate (copper 8%, zinc 8%, silver 6.5%) 0.4μ in diameter and spun at a speed of 1,370 m/min. The generations of broken short fiber, leading pressure hunting, dropping, cut yarn, thermal degradation polymer and fly waste were measured and the result are listed in Table 2 below.

EXAMPLE II

The procedure given in Example I was repeated, except that 24.3 g of the compound represented by the following structural formula:

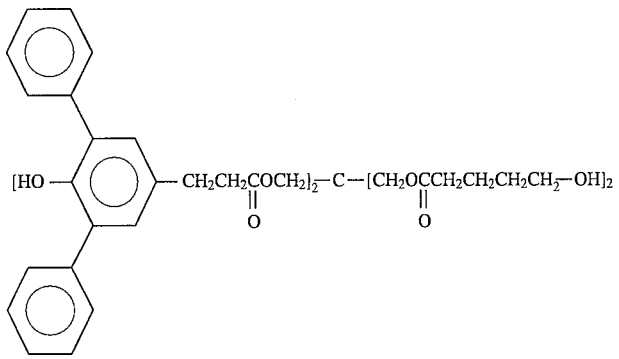

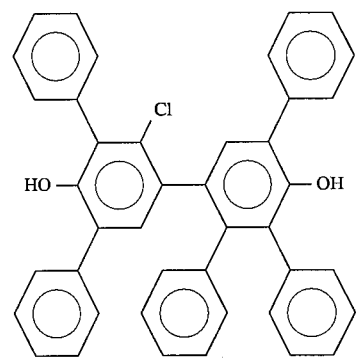

and 26.4 g of zinc acetate were dissolved in 3% ethylene glycol and esterified at 245° for 70 min, and 43.6 g of the compound represented by the following structural formula:

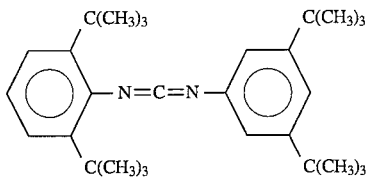

was added and then, polycondensed at a temperature of 280° to 285° C. for 125 min in the presence of 78.2 g of a mix catalyst of triethyl phosphate, cobalt acetate, antimony trioxide and butylene malate.

7

The physical properties of the polyester and fiber were measured and the results thereof are given as shown in Tables 1 and 2 below.

COMPARATIVE EXAMPLE I

The procedure given in Example I was repeated, except that 3.8 g of the compound represented the following structural formula:

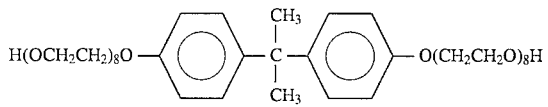

and 28.6 g of zinc acetate were added in 19.7 mole of the oligomer and esterified at 245° C. for 70 min, and polycondensation was carried out at a temperature of 280° to 285° C. for 130 min in the presence of 62.4 g of the mix catalyst.

The physical properties of the polyester and fiber were measured and the results thereof are given as shown in Tables 1 and 2 below.

COMPARATIVE EXAMPLE II

The procedure given in Example I was repeated, except that 22.3 mole of the oligomer was polycondensed at a temperature of 280° to 285° C. for 125 min in the presence of 71.9 g of the mix catalyst, without using any melt viscosity enhancer.

The physical properties of the polyester and fiber were measured and the results thereof are given as shown in Tables 1 and 2 below.

COMPARATIVE EXAMPLE III

The procedure given in Example I was repeated, except that 6.58 g of $(C_{12}H_{25}SCH_2CH_2COOCH_2)_4C$ and 28.6 g of zinc acetate were added in 19.7 mole of the oligomer and esterified at 245° C. for 70 min, and polycondensation was carried out at a temperature of 280° to 285° C. for 130 min in the presence of 62.4 g of the mix catalyst.

The physical properties of the polyester and fiber were measured and the results thereof are given as shown in Tables 1 and 2 below.

COMPARATIVE EXAMPLE IV

The procedure given in Example I was repeated, except that 5.8 g of the following compound:

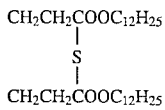

was added in 22.3 mole of the oligomer and polycondensed at a temperature of 280° to 285° C. for 125 min in the presence of 71.9 g of the mix catalyst.

The physical properties of the polyester and fiber were measured and the results thereof are given as shown in Tables 1 and 2 below.

COMPARATIVE EXAMPLE V

The procedure given in Example I was repeated, except that 9.3 g of the compound represented the following structural formula:

8

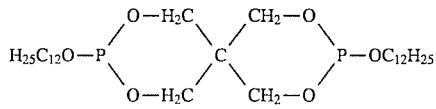

and 24.5 g of zinc acetate were added in 21.9 mole of the oligomer and esterified at 245° C. for 80 min, and polycondensation was carried out at a temperature of 280° to 285° C. for 135 min in the presence of 58.1 g of the mix catalyst.

The physical properties of the polyester and fiber were measured and the results thereof are given as shown in Tables 1 and 2 below.

TABLE 1

| Viscosity | Example | | Comparative Example | | | | |
|---|---|---|---|---|---|---|---|
| | I | II | I | II | III | IV | V |
| Melt (poise) | 6150 | 6030 | 2320 | 2300 | 2260 | 2390 | 2210 |
| Intrinsic | 0.71 | 0.69 | 0.54 | 0.53 | 0.50 | 0.56 | 0.50 |

* Measurement of Physical Properties
1. Melt Viscosity: using parallel plate method under 285° C. and 100 Rad/sec.
2. Intrinsic Viscosity: measured with Ubbelohd's viscometer after phenol and tetrachloroethanol were mixed in a ratio of 1:1 and dissolved in an aqueous bath maintained at 100° C.

TABLE 2

| Property | Example | | Comparative Example | | | | |
|---|---|---|---|---|---|---|---|
| | I | II | I | II | III | IV | V |
| Broken Short Fiber Leading Pressure | o | o | x | x | x | x | x |
| Hunting | o | o | x | x | x | Δ | x |
| Dropping | o | o | x | x | x | Δ | x |
| Cut Yarn Thermal Degradation | o | o | x | x | x | Δ | x |
| Polymer | o | o | Δ | Δ | x | Δ | x |
| Fly Waste | o | o | Δ | Δ | x | Δ | x |

*measured with naked eyes
o: not generated, Δ: a little, x: seriously

The present invention has been described in an illustrative manner, and it is to be understood the terminology used is intended to be in the nature of description rather than of limitation.

Many modifications and variations of the present invention are possible in light of the above teachings. Therefore, it is to be understood that within the scope of the appended claims, the invention may be practiced otherwise than as specifically described.

What is claimed is:

1. In a method for preparing polyester by the reaction of acidic component with diol component, an improvement that, upon the esterification, zinc acetate is dissolved in ethylene glycol to serve as a catalyst and an viscosity enhancer represented by the following general formula I:

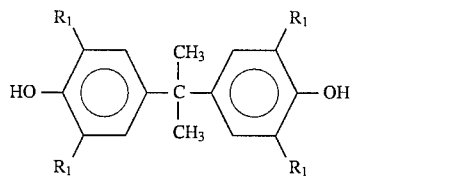

wherein $R_1$ is selected from the group consisting of $C_4H_9$, $C_6H_5$ and H, being the same and different from each other, or II:

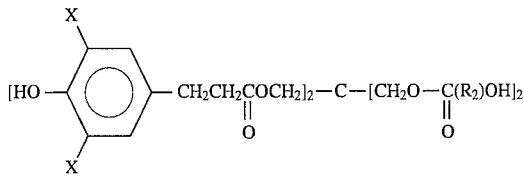

wherein $R_2$ is $C_nH_{2n}$ wherein n is an integer of 3 to 9, is added at an amount of 0.2 to 2.0% by mole relative to the resulting polyester and, in the polycondensing reaction, another viscosity enhancer represented by the following general formula III:

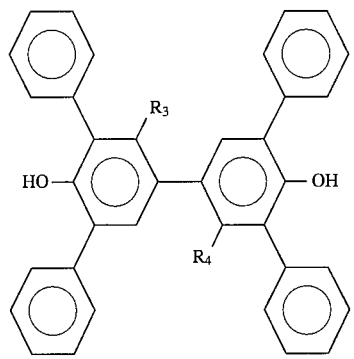

wherein $R_3$ is a hydrogen, a chlorine atom, a methyl group or a phenyl group; and $R_4$ is a hydrogen, a methyl group or a phenyl group, or IV:

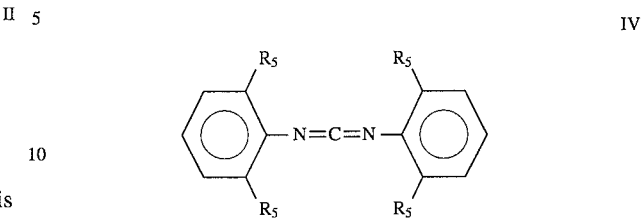

wherein $R_5$ is t-butyl, is added at an amount of 0.1 to 1.5% by mole relative to the resulting polyester, to give polymers which is then compounded with antibacterial and deodorant zirconium phosphate at any steps prior to the spinning process.

2. A method in accordance with claim 1, wherein said antibacterial and deodorant zirconium phosphate has metal ions replaced with 0.01 to 10% of copper, 0.05 to 10% of zinc and 0.1 to 6.5% of silver.

3. A method in accordance with claim 1, wherein said zirconium phosphate is used at an amount of 0.05 to 10% by weight based on the weight of the resulting polyester.

* * * * *